Figure 1:
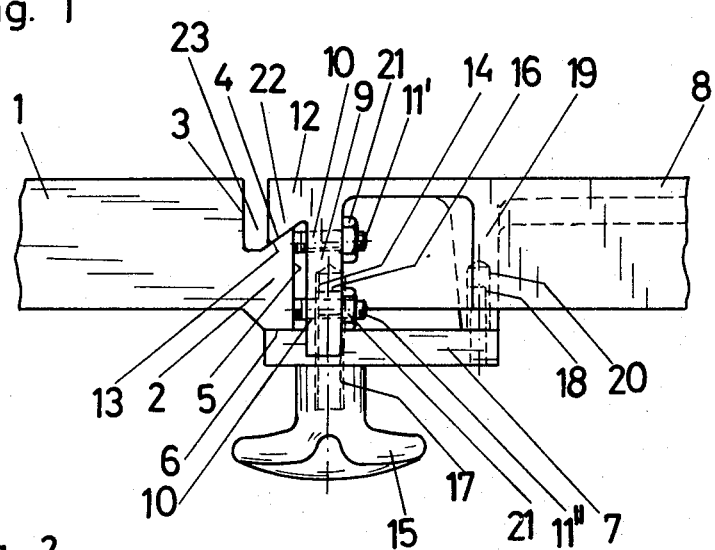

United States Patent
Felder, Jr.

[15] 3,695,189

[45] Oct. 3, 1972

[54] REMOVABLE EXTENSION PLATE

[72] Inventor: Johann Felder, Jr., Salzbergstrasse 26, 6060 Absam, Austria

[22] Filed: July 13, 1970

[21] Appl. No.: 54,340

[52] U.S. Cl. ............ 108/65, 108/69, 143/132 B, 144/287
[51] Int. Cl. ................................. A47b 1/00
[58] Field of Search ......... 108/65, 69, 90; 143/132 B; 144/286, 287

[56] References Cited

UNITED STATES PATENTS

| | | | |
|---|---|---|---|
| 1,848,475 | 3/1932 | Hackett | 108/69 |
| 1,896,924 | 2/1933 | Ulrich | 143/132 B |
| 2,555,217 | 5/1951 | Young | 144/286 X |

*Primary Examiner*—James C. Mitchell
*Attorney*—Kemon, Palmer & Estabrook

[57] ABSTRACT

A removable extension plate for a work supporting table with projections on said plate and table having inclined faces engageable with one another. The plate is vertically adjustable at its inner end that is connected to the table and angularly adjustable at its free end to permit the surface of the plate to coincide with the surface of the table.

5 Claims, 2 Drawing Figures

PATENTED OCT 3 1972 3,695,189

INVENTOR
Johann Felder, Jr.
BY
Kenyon, Palmer + Estabrook
ATTORNEYS

REMOVABLE EXTENSION PLATE

This invention relates to a removable extension plate for work supporting tables and more particularly for wood-working machines. The table has one or more bar-like fixtures or rib like supports whose upper surface lies at a vertical distance below the table surface while the plate is provided with one or more guide bars or the like supported on said fixture.

Extension plates of this kind provide a support that precludes long boards from pitching down during the working of such boards. Machines with appropriately long tables are more expensive and cannot be easily accomodated in small works where room is restricted and small workpieces are treated much more frequently.

An extension table made of wood bars is known whose junction end is joined by means of sectional bars to a bar secured to the machine table and can be screwed to the latter. At its other end the extension table is supported on the floor by a hinged frame. Not only is the arrangement time-consuming, but the alignment of the plate is extremely difficult. The extension plate has to be in alignment with the supporting table in any direction; neither a step nor a projection must occur at the abutting edge.

The structure of the present invention is free from the mentioned disadvantage, in that the assembly or mounting of the plate upon the table requires relatively few manipulations and alignment is easy.

This is obtained in that a guide bar is provided with one or more prolongations or segments extending downwardly in its zone facing the table, wherein said prolongation engages in an appropriate recess of the fixture and two or more known spacers, preferably screws, adjustable independently of each other, are provided between table and plate, one of which determines the vertical position, the other the angular position of the plate at its junction end.

The plate is supported upon the fixture and the prolongations or segments insure a positive connection with the table in a horizontal direction. Alignment of the plate is particularly easy due to a plurality of adjustments according to which height and angular position of the plate can be altered independently.

A particularly simple embodiment is obtained by providing an inclined plane which in cooperation with a vertically operating clamping device secures the plate in a horizontal position with respect to the table. An adjustable spacer element is capable of altering the horizontal distance between the table and plate so as to cause the plate to rise and lower, during which the plate glides up and down on this inclined surface.

The invention is hereinafter described with reference to an embodiment without being limited to it.

Figure 2:
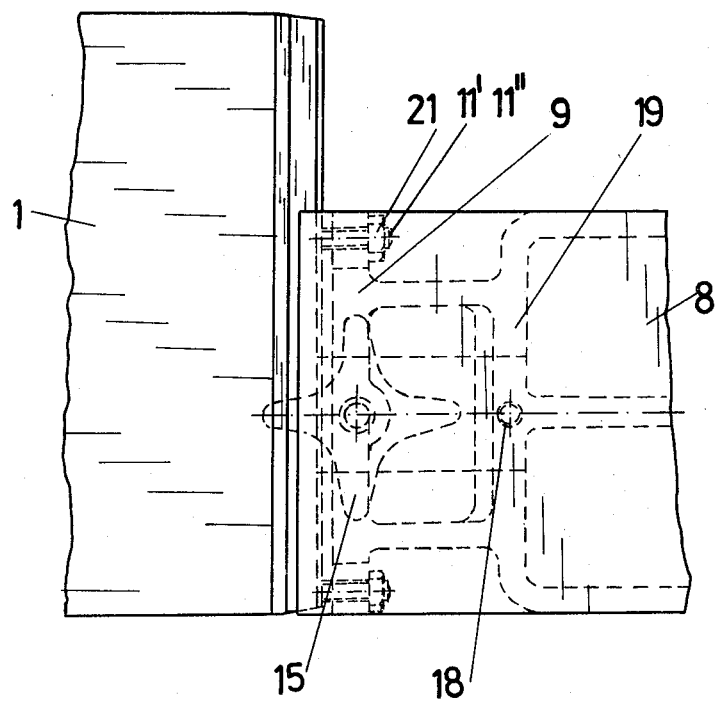

FIG. 1 is a plan view, FIG. 2 is a top view of the junction zone between table and plate.

In the drawing 1 refers to a supporting table of a planing machine, for example. At the end of said supporting table 1 a guide bar or rib like support 2 is provided, which constitutes a vertical surface 3 of said table that terminates in an inclined surface 4 that produces a recess 23 between said surfaces. Said inclined surface 4 terminates in a downwardly extending vertical surface 5; the bar 2 is closed by a horizontal surface 6 which serves as a supporting surface for a clamping shoe 7. Said bar 2 preferably extends over the whole breadth of the supporting table 1.

The extension plate 8 has the form of a ribbed cast plate resistant to bending at its underside. At its junction end facing the table it is closed by a vertical bar 9 which is provided with four horizontal threaded bores 10. The latter are arranged, each, one above the other, at the ends of the bars 9 in such manner that the stud bolts 11', 11'' received by the latter can engage the vertical surface 5 of the table 1 by their shaft end.

At the upper edge of the bar 9 a guide bar 12 extends towards the supporting table 1 and is provided with a bar-like prolongation or segment 22 provided with in inclined surface 13. Direction and position of the inclined surface 13 correspond to those of the inclined surface 4 of the table 1 and inclined surface 13 rests on the latter.

The bar 9 is provided in the middle thereof with a vertical threaded bore 14 which is adapted to receive a screw 16 provided with a star knob 15. Said screw 16 extends through a bore 17 in the clamping shoe 7, at the other end of which a pin 18 is inserted as security device against torsion. A bore 20 provided in a rib 19 is adapted to receive the pin 18.

To assemble the plate the stud bolts 11', 11'' and their counternuts as well as the clamping shoe 7 and the screw 16 are loosely secured to the plate 8. The latter is shifted to the table 1 from one side. By adjustment of the upper screws 11' the height of the plate 8 at its junction end is adjusted without any step. If the upper screws 11' are screwed up to raise the plate 8, the screw 16 is to be somewhat loosened. Subsequently, the free end of the table 8 can be lifted by screwing up the lower screws 11'' or lowered by loosening them. If the plate 8 is in alignment with the table 1, the counternuts 21 and the screw 16 are tightened up. If the extension plate is only used for a sole machine, the screws 11', 11'' and the counternuts 21 can remain tightened up. In the case of a plate used for different machines it may be necessary to alter the adjustment of the screws 11', 11'', which is done rapidly and easily.

A great number of embodiments lies within the scope of the invention. Instead of the bars provided with inclined surfaces, for example, hook-like prolongations segments bent upwardly may be provided on the plate which engage in a groove that opens upwardly in the table. A stud bolt vertically screwed in the plate may then be provided as a spacer which determines the vertical position, of the plate which rests on the supporting bar of the table by one shaft end. Numerous variants of arrangement of the spacers, which may be wedges, eccenters or the like, are possible. Horizontal fixture of the plate may be attained, amongst other things, by a pin vertically inserted in the plate, which is formed in an appropriate bore or a slot in the table; if a screw is used instead of this, it may serve simultaneously as spacer for adjustment of the vertical position.

I claim:

1. In combination a work supporting table and a removable extension plate therefor, said table having at least one rib like support provided along at least one side thereof, the upper surface of said support being spaced from said table and terminating in a horizontal plane below the horizontal surface of said table, an end of said extension plate having at least one guide bar positioned upon the upper surface of said rib like support, said guide bar terminating in a segment arranged to project into the space between said table and rib like support for engaging said rib like support, said plate having a plurality of adjustable members engagable with said rib like support with at least one of said adjustable members varying the position of the guide bar and plate with respect to said table surface and at least another of said adjustable members varying the position of the free end of said plate with respect to said table surface.

2. In combination a work supporting table and a removable extension plate as set forth in claim 1 wherein said rib like support and said segment are formed with coacting inclined faces and said adjustable members are disposed in horizontal planes with a vertically disposed clamping device associated therewith.

3. In combination a work supporting table and a removable extension plate as set forth in claim 2 wherein the coacting inclined faces slope towards said table.

4. In combination a work supporting table and a removable extension plate as set forth in claim 1 wherein said plate is provided with a depending bar and the adjustable members are threaded screw elements, said bar having threaded openings for said screw elements which engage said rib like support.

5. In combination a work supporting table and a removable extension plate as set forth in claim 4 wherein a clamping element engages said rib like support and said plate, said clamping element has one end secure to said plate by a pin member and a threaded member carried by said clamping element engages said depending bar.

* * * * *